G. W. BOYNTON.
HOLDER FOR AUTOMOBILE LICENSES.
APPLICATION FILED OCT. 7, 1918. RENEWED AUG. 23, 1920.
1,374,182.
Patented Apr. 12, 1921.
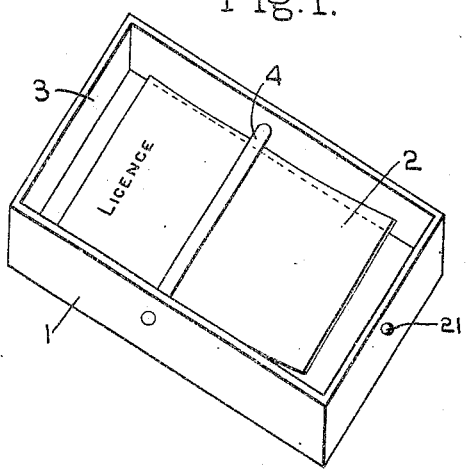
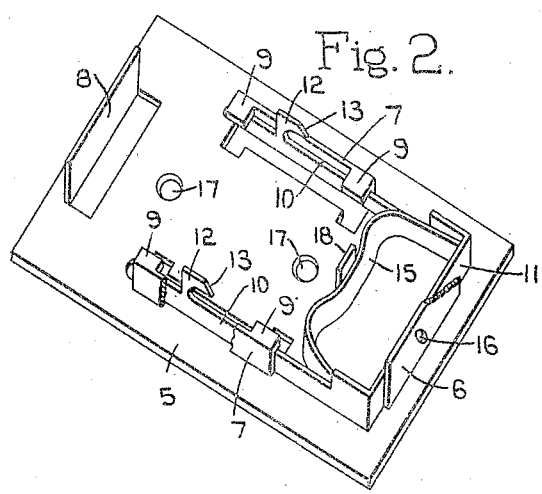
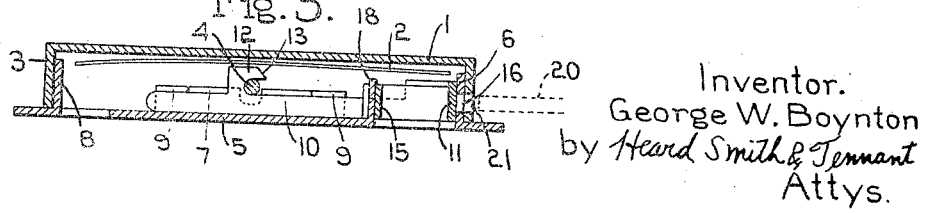
Inventor.
George W. Boynton
by Heard Smith & Tennant
Attys.

UNITED STATES PATENT OFFICE.

GEORGE W. BOYNTON, OF WATERTOWN, MASSACHUSETTS.

HOLDER FOR AUTOMOBILE-LICENSES.

1,374,182. Specification of Letters Patent. Patented Apr. 12, 1921.

Application filed October 7, 1918, Serial No. 257,136. Renewed August 23, 1920. Serial No. 405,486.

*To all whom it may concern:*

Be it known that I, GEORGE W. BOYNTON, a citizen of the United States, residing at Watertown, county of Middlesex, State of Massachusetts, have invented an Improvement in Holders for Automobile-Licenses, of which the following description, in connection with the accompanying drawing, is a specification, like characters on the drawing representing like parts.

This invention has for its object to provide a novel container or holder adapted to be secured to an automobile and constructed to hold or retain the operator's license, registration certificate, and any other similar paper which it is important to have in his possession when operating an automobile.

My improved device comprises a supporting plate adapted to be secured permanently to an automobile in some convenient place, a license-retaining member adapted to receive the license, and means for detachably securing the license-retaining member to the supporting plate.

In order to give an understanding of my invention, I have illustrated in the drawings a selected embodiment thereof which will now be described, after which the novel features of the invention will be pointed out in the appended claims.

In the drawings, Figure 1 is a perspective view showing the inside of the license-retaining or receiving member;

Fig. 2 is a view of the supporting plate;

Fig. 3 is a longitudinal section through the device.

My improved license holder comprises a license-receiving member 1 adapted to contain the license 2, and a supporting plate 5 which is permanently secured to the automobile and to which the license-retaining member 1 is detachably secured. This license-retaining member 1 is formed with a peripheral flange 3 and with a rod or bar 4 which extends transversely across the retaining member 1 and is separated somewhat from the body of said member 1. The license 2 is placed between this rod 4 and the back of the retaining member, said rod thus operating as a retaining member for the license. The rod also constitutes part of the means for locking the license-retaining member 1 to the supporting plate 5, as will be presently described.

The supporting plate 5 is fixedly secured to some suitable part of the automobile, such, for instance, as the instrument-board, back of the seat, etc., and this may conveniently be done by means of screws passing through apertures 17. Said supporting plate is provided with positioning projections 7, 7, 6, 8 which are properly situated to enter the flange 3 when the license-retaining member 1 is placed in position on the plate, said flanges thus serving to hold the member 1 from lateral movement. These projections can conveniently be made by striking up a portion of the metal of the supporting plate 5. The two positioning projections 7 are situated opposite each other, and each is provided with the latch-guiding ears 9 which embrace the upper edges of latch members 10 that are slidably mounted on the supporting plate 5. These latch members overlie the inner faces of the projections 7 and are held in their proper position by the guiding fingers 9. These two latch members are connected together by the bridge portion 11 so that they move in unison and they are acted upon by a spring 15 which tends to hold the bridge portion 11 against the upturned projection 6. This spring 15 is retained in position by the retaining finger 18.

Each latch member 10 carries a latch 12 which is provided with a beveled face 13 and is adapted to engage the rod 4 thereby to lock the license-retaining member 1 to the supporting plate. The construction of the latches is such that when the license-retaining member 1 is moved toward the supporting plate 5 thereby to place said holding member in operative position, the rod 4 will engage the beveled faces 13 of the latches and force them backwardly thereby to allow the rod to pass below the latch members. The engagement of the rod 4 with the faces 13 will force the latch members backwardly against the action of the spring 15, and when the rod has wiped by said faces, the spring 15 will move the latch members forwardly thereby to carry the latches over the rod, as shown in Fig. 3, thus securely locking the license-retaining member to the supporting plate. It will be noted that the locking means is entirely inclosed within the license-retaining member and thus when said member is secured to the supporting plate, it will not be possible for any unauthorized persons to remove the member 1 and thus obtain access to the license.

In order to permit the license-retaining member 1 to be removed when desired, I have provided the flange at one end of the license-holding member 1 with an aperture 21 and the upturned projection 6 with an alined aperture 16 through which a pin or suitable implement 20 may be inserted thereby to press against the bridge 11 and force the latch members 10 backwardly to disengage the latches from the rod 4.

I claim:

1. A license holder comprising a supporting plate, a latch mounted thereon for movement parallel thereto, a license-retaining member having a license-receiving pocket and also having a rod extending across said pocket but spaced from the bottom thereof whereby a license may be inserted between the rod and pocket bottom, said rod being adapted to be engaged by said latch thereby to lock said member to the plate.

2. A license holder comprising a supporting plate, a latch mounted thereon for movement parallel thereto, a license-retaining member having a license-receiving pocket and also having a rod extending across said pocket for retaining the license therein, said rod being adapted to be engaged by said latch thereby to lock said member to the plate, said plate having positioning lugs to engage the license-retaining member and prevent movement of the latter transversely of the plate.

3. A license holder comprising a plate having positioning lugs extending therefrom, a spring-pressed latch slidably mounted in one of said lugs, and a license-retaining member retained in position on said plate by said lugs, said member having a rod extending transversely thereacross and adapted to be engaged by said latch whereby the member is locked to the plate.

4. A license holder comprising a supporting plate, a latch movably mounted thereon, a license-retaining member having a license-receiving pocket and also having a rod extending across said pocket but spaced from the bottom thereof whereby a license may be inserted between the pocket rod and the pocket bottom, said rod being adapted to be engaged by the latch thereby to lock the member in place.

In testimony whereof, I have signed my name to this specification.

GEORGE W. BOYNTON.